United States Patent [19]

De Varreux

[11] Patent Number: 4,903,561
[45] Date of Patent: Feb. 27, 1990

[54] INCLINABLE BLADE BAND SAW

[75] Inventor: Jean-Loup De Varreux, Saint Germain en Laye, France

[73] Assignee: Luren S.A., Domfront, France

[21] Appl. No.: 245,677

[22] Filed: Sep. 16, 1988

[30] Foreign Application Priority Data

Sep. 16, 1987 [FR] France .................... 87 12839

[51] Int. Cl.⁴ .................... B27B 13/04; B23D 53/04
[52] U.S. Cl. .................................... 83/811; 83/812
[58] Field of Search .................... 83/810, 811, 812

[56] References Cited

U.S. PATENT DOCUMENTS

| 442,420 | 12/1890 | Coan | 83/812 |
| 797,321 | 8/1905 | Rishebarger | 83/812 |
| 3,801,089 | 4/1974 | Fukugami et al. | 83/810 X |

FOREIGN PATENT DOCUMENTS 573218  3/1933  Fed. Rep. of Germany ........ 83/812

Primary Examiner—Donald R. Schran
Attorney, Agent, or Firm—Burns, Doane, Swecker & Mathis

[57] ABSTRACT

The band saw of the present invention comprises a base provided with two pillars supporting a saw table. A casing of swan-neck shape forms the frame of the machine. This casing has a wall adjacent to a wall of the base. A first aperture having the shape of an arc of a circle, cut out in the casing wall, faces a second, rectilinear aperture in the base wall. A first locking member pivoted on the casing wall passes through the two apertures. In addition, the base wall is cut out in such a manner that a second locking member fastened to the casing wall cooperates with the top edge of the base wall.

9 Claims, 3 Drawing Sheets

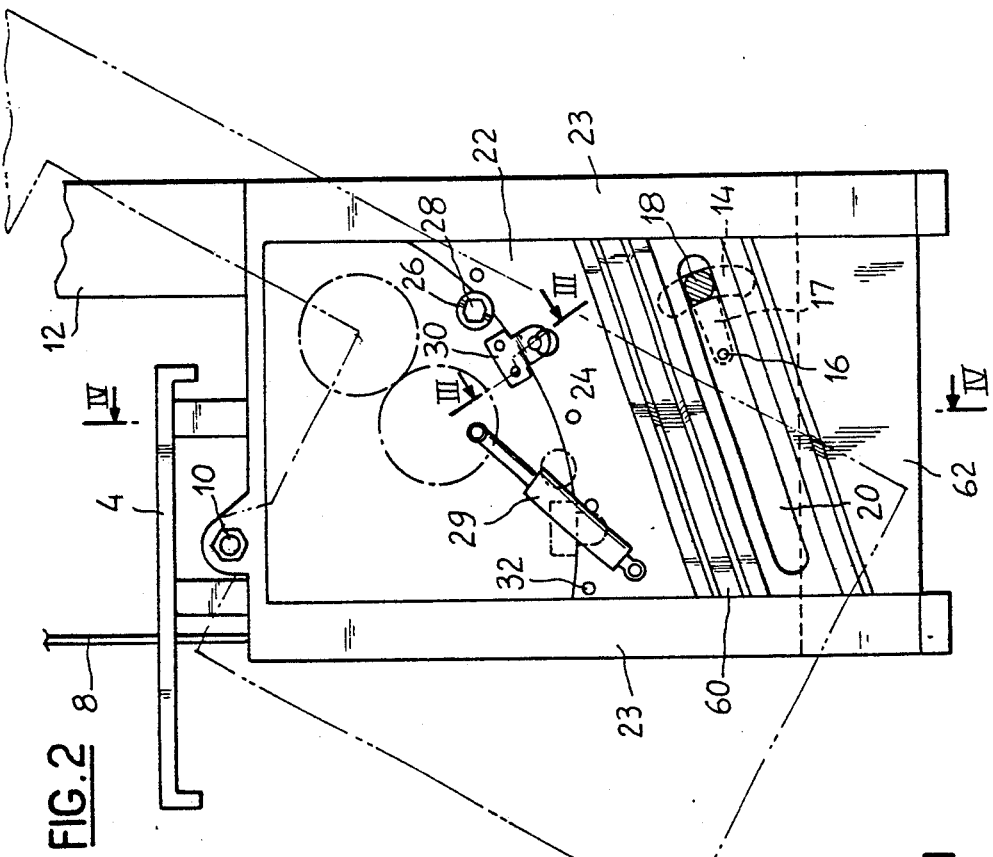
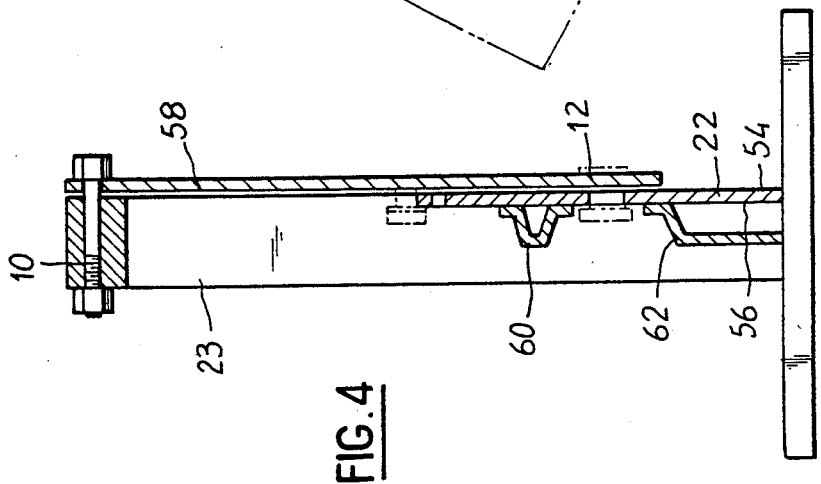

INCLINABLE BLADE BAND SAW

The present invention relates to a band saw in which the sawblade is inclinable relative to the saw table.

Existing band saws are provided at the present time with a fixed vertical sawblade and a saw table which is inclinable about a horizontal axis. A construction of this kind makes the use of the saw difficult or even dangerous for relatively large sawing angles.

However, from document FR-A-2 442 704 a band saw is known which is of the type comprising a table, a frame supporting blade guide pulleys, a motor driving the blade with the aid of a belt and drive pulleys. The frame is mounted for pivoting about an axis parallel to that of the pulleys and is carried by a sliding member mounted in a slide guide provided under the saw table. In addition, the frame is housed in a casing having an aperture in the shape of an arc of a circle centred on the pivoting axis of the frame. A locking screw fastened to an arm carried by the table feet passes through this aperture and extends beyond the limits of the saw table, along the longitudinal axis of the latter.

The frame locking point is situated outside the saw table, so that the stability of the arrangement is poor. In addition, the presence of a single locking point is insufficient to ensure effective safety during the operation of the unit.

In order to overcome these disadvantages, the invention seeks to provide a band saw which is compact and stable and in addition has two locking points situated vertically in line with the saw table.

To this end the invention has as its object:

a band saw comprising a base supporting a saw table, a frame supporting guide pulleys and drive means for a sawblade and mounted on the base for pivoting about a horizontal axis, the frame being housed in a casing of which one wall has a first aperture, while a member locking the frame in an angular position is connected to the base and passes through the first aperture, characterized in that the locking member passes through a second aperture which is situated opposite the first aperture and formed in a base wall adjacent to the casing wall and which extends vertically in line with the saw table.

A device of this kind thus makes it possible to obtain a locking point situated on a vertical wall of the base and lying vertically in line with the saw table whatever the angular position of the casing. In addition, a band saw is thus obtained which is more compact and more stable than in the prior art.

According to other characteristics:

the second aperture is rectilinear, the first aperture being incurved;

the first aperture has the shape of a sector of a circle and the locking member is mounted on the casing wall for pivoting about a horizontal axis passing through the geometrical centre of the first aperture having the shape of a sector of a circle;

the base wall has a top edge cut out in the form of an arc of a circle whose geometrical centre is on the pivot axis of the casing, and the casing wall is provided with a second locking member situated between the pivot axis of the frame and the rectilinear aperture;

the second locking member consists of a clamp member fixed on the casing wall to cooperate with the top edge of the base wall.

This arrangement provides a second locking member situated vertically in line with the saw table.

According to additional characteristics:

the base wall is provided with holes situated on a circle having its centre on the pivot axis of the frame, the holes being intended to cooperate with a retractable indexing member fastened to the casing wall to position the the frame in predetermined angular positions;

the rectilinear aperture forms an acute angle with the support plane of the base, and the base wall is provided with reinforcements in its solid parts;

the saw is in addition provided with a balancing jack connected on the one hand to the base and on the other hand to the casing;

the casing has a wall which lies opposite the wall provided with the first aperture and which consists of a door.

The invention will be described below in greater detail with reference to the accompanying drawings, which are given solely as examples and in which:

FIG. 2 is a partial view in elevation of the saw, in which the blade is at right angles to the table, and in which an inclined position of the casing is shown in dot-dash lines;

FIG. 4 is a partial view in section on the axis 4—4 in FIG. 2;

Figure 1:
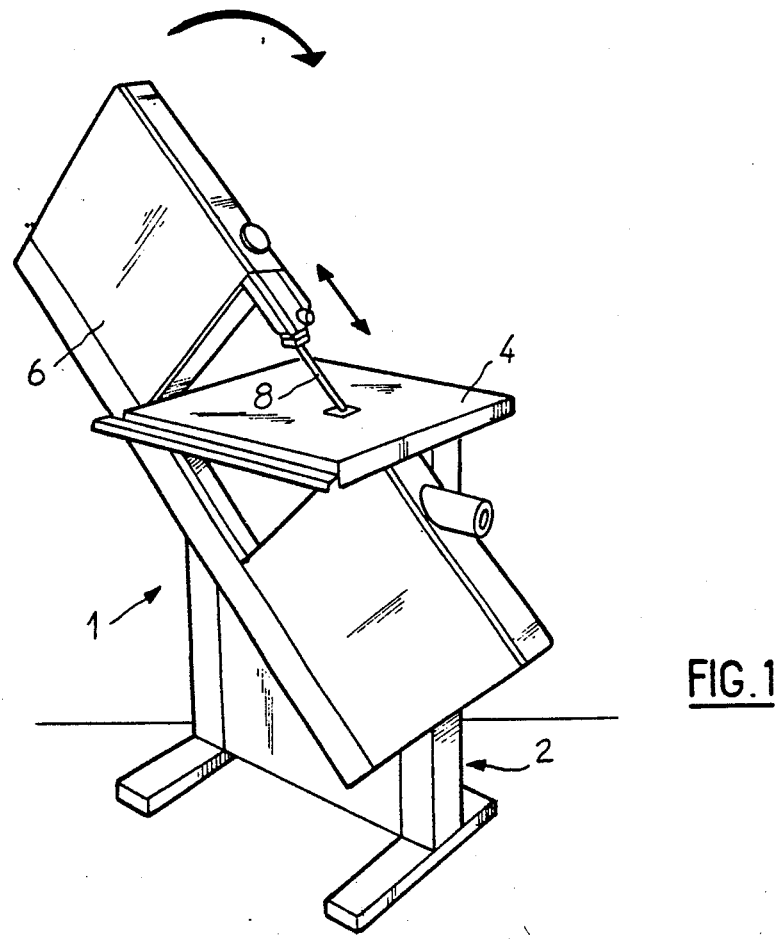
FIG. 1 is a schematic view in perspective of a band saw according to the invention, the sawblade being inclined laterally relative to the saw table.

FIG. 1 shows schematically a band saw 1 according to the invention, comprising a base 2 supporting a saw table 4 and carrying, pivoted on it, a casing 6 forming a swan-neck machine frame. As will be seen later on, this casing 6 supports drive means for a sawblade 8 in the form of a blade passing through the saw table 4 approximately at the centre of the latter.

In FIG. 2 it can be seen that the casing 6 is mounted on the base 2 for pivoting about a horizontal axis 10 situated under the saw table 4, close to the latter and at a distance from the point where the sawblade 8 passes. The casing 6 has a plane wall 12 which lies adjacent to the base and in which a first aperture 14 is cut. This aperture 14 has the shape of an arc of a circle whose geometrical centre is situated on an axis 16, about which is pivoted a lever 17 on which is fixed one end of a threaded rod 18 passing through the aperture 14 and projecting through a second aperture 20 cut in a wall 22 of the base. This threaded rod 18 is intended to receive a nut 19 (see FIG. 4) for the purpose of locking by a clamping action the casing wall 12 in relation to the base wall 22. This second aperture 20 is rectilinear and slightly inclined, forming an acute angle to the horizontal.

The base wall 22 extends between two pillars 23 of rectangular section and has a top edge 24 cut in the shape of an arc of a circle centered on the axis 10.

A second locking member 26 fastened to the casing wall 12 is situated near the top edge 24 of the base wall 22 and has a threaded portion extending beyond the base wall 22.

On this threaded portion is screwed a nut 28, which will also enable the casing wall 12 to be locked by a clamping action in relation to the base wall 22.

This second locking member 26 is thus situated between the pivot axis 10 of the casing and the second aperture 20.

A balancing jack 29 of the usual type is provided, of which one end is fastened to the base wall 22 and the other end is fastened to the casing wall 12.

An indexing member 30 fixed on the casing wall 12 cooperates with holes 32 formed in the base wall 22. These holes 32 are disposed near the top edge 24 of the base wall 22 and their axes are situated on a circle which is likewise centred on the pivot axis 10 of the casing 6.

Figure 3:
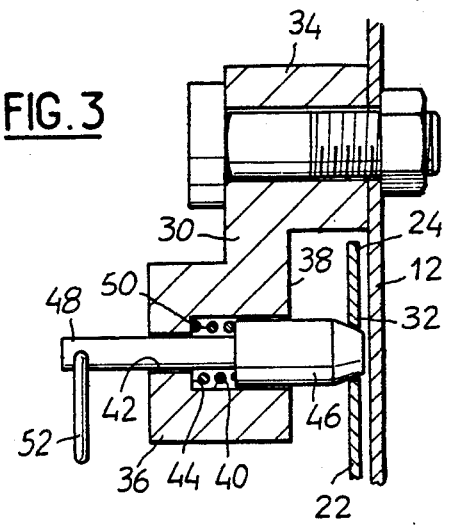
FIG. 3 is a partial view in section on the axis 3—3 in FIG. 2.
Figure 6:
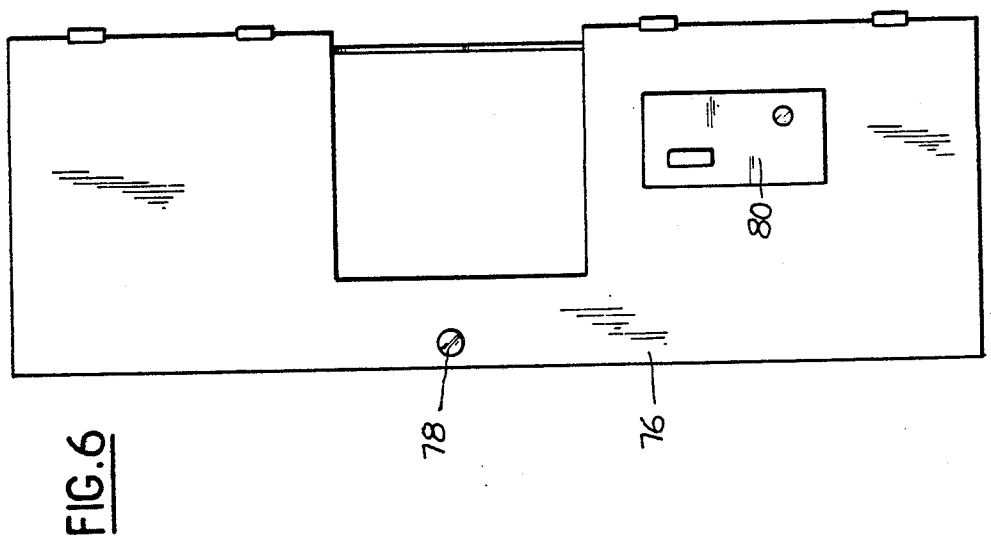
FIG. 6 is an elevation of the casing wall opposite the wall shown in FIG. 5.

This indexing member 30 is shown in section in FIG. 3. Referring to this figure, it will be seen that it has a top part 34 fixed by any known means to the casing wall 12. This part 34 is situated above and close to the top edge 24 and extends from the casing wall 12 to a point beyond the base wall 22.

The bottom part 36 of the indexing member 30 has a plane face 38 situated opposite the top end 24 and the holes 32 in the base wall 22.

A first bore 40 is formed in this face 38 and has formed in its bottom a bore 42 of smaller diameter, thus forming a shoulder 44. The axis of these bores is situated on a circle likewise centred on the axis 10 and passing through the axes of the holes 32.

The bore 40 receives slidingly a cylindrical nipple extended at one end by a rod 48 passing through the bore 42. The other end of the nipple has a frustoconical shape intended to facilitate its introduction into a hole 32.

A spring 50 bearing against the shoulder 44 pushes the nipple 46 against the base wall 22, and when the axis of the bore 38 and that of the hole 32 are in alignment the nipple 46 penetrates into the hole 32, thus locking the casing wall in a determined position corresponding to precise angular positions, for example 15°, 20° or other angles.

At its free end the rod 48 is provided with a device 52, known per se, which is intended to provide a good grip for the withdrawal of the nipple 46 from the hole 32 and to move it away from the base wall 22 against the action of the spring 50.

Referring now to FIG. 4, it will be seen that the base wall 22 has a face 54 facing the casing wall 12. The face 54 of the base wall 22 is situated in a vertical plane passing through the walls 58 of the pillars 23 which face the casing wall 12.

That face 56 of the base wall 22 which lies opposite to the face 54 is provided with stiffening reinforcements 60 and 62.

Figure 5:
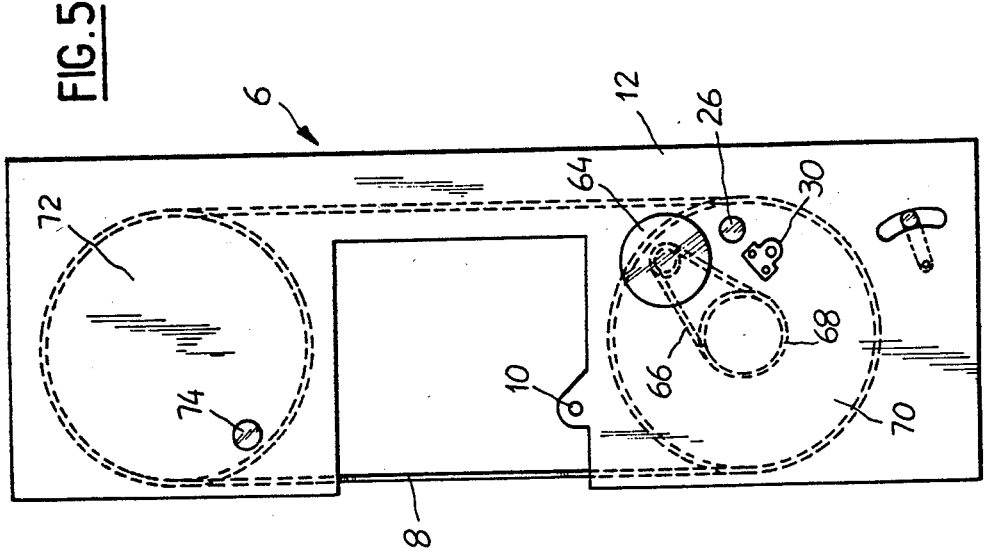
FIG. 5 is an elevation of the casing wall adjacent to the base.

Referring to FIG. 5, which shows the casing wall 12, it will be seen that this wall supports a motor 64 projecting from said casing wall 12 in the direction of the base wall 22. With the aid of a belt 66 the motor drives a drive pulley 68 fastened to a guide pulley or flywheel 70, this assembly being situated in the bottom part of the swan-neck casing 6. The top part of the casing 6 is provided with a flywheel 72, and the sawblade 8 is stretched over these two flywheels with the aid of a tensioning device (not shown). A grip button 74 is provided on the top part of the casing wall 12 to enable the force required for the rotation of the casing 6 about the axis 10 to be applied.

The casing wall opposite to the wall 12 forms a door 76 mounted pivotally on an edge of the discontinuous side of the swan-neck casing, and is provided with an opening and closing knob 78. This door 76 also supports the control panel 80 of the band saw 1.

After the movement of the sawblade 8 has been stopped for reasons of safety, and starting from any position of the sawblade 8, the nut 19 of the first locking member 18 and the nut 28 of the second locking member 26 are unscrewed. The member 52 of the rod 48 is then pulled in order to withdraw the nipple 46 against the action of the spring 50. With the aid of the button 74 the casing 6 is then pivoted about the axis 10 in order to bring it into the desired position. The member 52 is then released, so that, if the angular position of the casing corresponds to a position predetermined by one of the holes 32, the nipple 46 will be positioned in the corresponding hole 32. For a position intermediate between two holes 32 the nipple 46 will strike against the face 56 of the base wall 22. It is then sufficient to tighten the nuts of the locking members 26 and 18 to lock the casing 6 in position relative to the base 2. The band saw is then ready for sawing with the desired angle of inclination in relation to the saw table.

A device is thus obtained which has only two flywheels housed in a compact casing. In addition, the reliability of the locking is increased by the presence of two locking members.

The connection and force transmission points between the base and the casing are the casing pivot axis and the two locking members. These three points are situated practically at the centre of the seating of the base, vertically in line with the saw table and not overhanging as in the prior art, so that the stability of the band saw is increased.

I claim:

1. Band saw comprising a base supporting a saw table, a casing forming a frame which carries guide pulleys and drive means for a saw blade, the frame being mounted on the base for pivoting about a horizontal axis, the frame including a first wall having a first aperture, the base including a second, substantially vertically oriented wall situated below the saw table adjacent the first wall, the second wall having a second aperture; the first and second apertures being capable of alignment during rotation of the frame about the horizontal axis, and a locking member passing through the first and second apertures for locking the frame in an angular position.

2. Band saw according to claim 1, wherein the second aperture is rectilinear, the first aperture being incurved.

3. Band saw according to claim 2, wherein the first aperture has the shape of a sector of a circle and the locking member is mounted on the first wall for pivoting about a horizontal axis passing through the geometrical centre of the first aperture having the shape of a sector of a circle.

4. Band saw according to claim 1, wherein the second wall has a top edge cut out in the form of an arc of a circle whose geometrical centre is on the pivot axis of the casing, and in that the first wall is provided with a second locking member situated between the pivot axis of the frame and the rectilinear aperture.

5. Band saw according to claim 4, wherein the second locking member consists of a clamp member fixed on the first wall to cooperate with the top edge of the second wall.

6. Band saw according to claim 1, wherein the second wall is provided with holes situated on a circle having its centre on the pivot axis of the frame, the holes being intended to cooperate with a retractable indexing member fastened to the first wall to position the frame in predetermined angular positions.

7. Band saw according to claim 2, wherein the rectilinear aperture forms an acute angle with the support plane of the base, and in that the second wall is provided with reinforcements in its solid parts.

8. Band saw according to claim 1, further including a balancing jack connected on the one hand to the base and on the other hand to the casing.

9. Band saw according to claim 1, wherein the casing has a third wall which lies opposite the first wall and which consists of a door.

* * * * *